United States Patent [19]

Beck et al.

[11] 4,335,973
[45] Jun. 22, 1982

[54] RUNNER SPLICER BAR

[75] Inventors: Martin J. Beck, Roxford; George F. W. Boesel, Canton, both of Mass.

[73] Assignee: Armstrong World Industries, Inc., Lancaster, Pa.

[21] Appl. No.: 246,070

[22] Filed: Mar. 20, 1981

[51] Int. Cl.³ .............................................. F16B 7/04
[52] U.S. Cl. .................................. 403/300; 403/205; 52/667
[58] Field of Search ............... 403/346, 347, 300, 205; 52/667, 484, 726

[56] References Cited

U.S. PATENT DOCUMENTS

| | | | |
|---|---|---|---|
| 3,284,977 | 11/1966 | Lickliter | 52/726 X |
| 3,288,489 | 11/1966 | Jahn | 52/726 X |
| 3,350,125 | 10/1967 | Adams | 403/300 X |
| 3,427,054 | 2/1969 | Bergman | 52/726 X |

Primary Examiner—Andrew V. Kundrat

[57] ABSTRACT

A splicer bar is provided for fastening together two inverted T-shaped runners. The splicer bar spans the junction between two runners and the splicer bar is fastened to the vertical web of both runners. Each runner has spaced apertures in its vertical web and the splicer bar has snap fasteners that will fit into these apertures to hold the two runners in parallel alignment and fixedly fastened together.

3 Claims, 2 Drawing Figures

RUNNER SPLICER BAR

BACKGROUND OF THE INVENTION

1. Field of the Invention

The invention is directed to a suspended ceiling system runner and, more particularly, to a splicer bar joint for connecting together two suspended ceiling runners.

2. Description of the Prior Art

Many different joint structures are utilized for fastening together two runners for a suspended ceiling system. The prior art structures are basically joint structures fabricated as two different, but mating ends on the runner structures so that two runner structures may be held in locking engagement. The runners are fabricated with special ends which engage with other special ends on other runners. It is typical to provide a runner with a female joint member on one end and a male joint member on the other end so that the adjacent runners can have the female and male ends thereof joined together.

The invention herein is directed to a simple joint structure wherein both ends of the runner member are made with identical end configurations and are fastened together through the use of a simple splicer bar.

SUMMARY OF THE INVENTION

In the invented structure herein, two identical runner members are fastened together. Each runner member at each end has a dual aperture structure placed therein. The runner members are joined together by a splicer bar which will extend back from the edge of the runner member approximately 3 inches. The splicer bar has lugs which will engage the dual apertures of each runner member. The splicer bar will engage the apertures of the one runner member and it will engage the apertures of an end of an adjacent runner member. Due to the fact that the splicer bar is fixedly held in position, adjacent the vertical web of the runner members through the engagement of the lugs with the apertures, the two runner members will be held in a fixed adjacent relationship to each other.

DESCRIPTION OF THE PREFERRED EMBODIMENT

Figure 1:
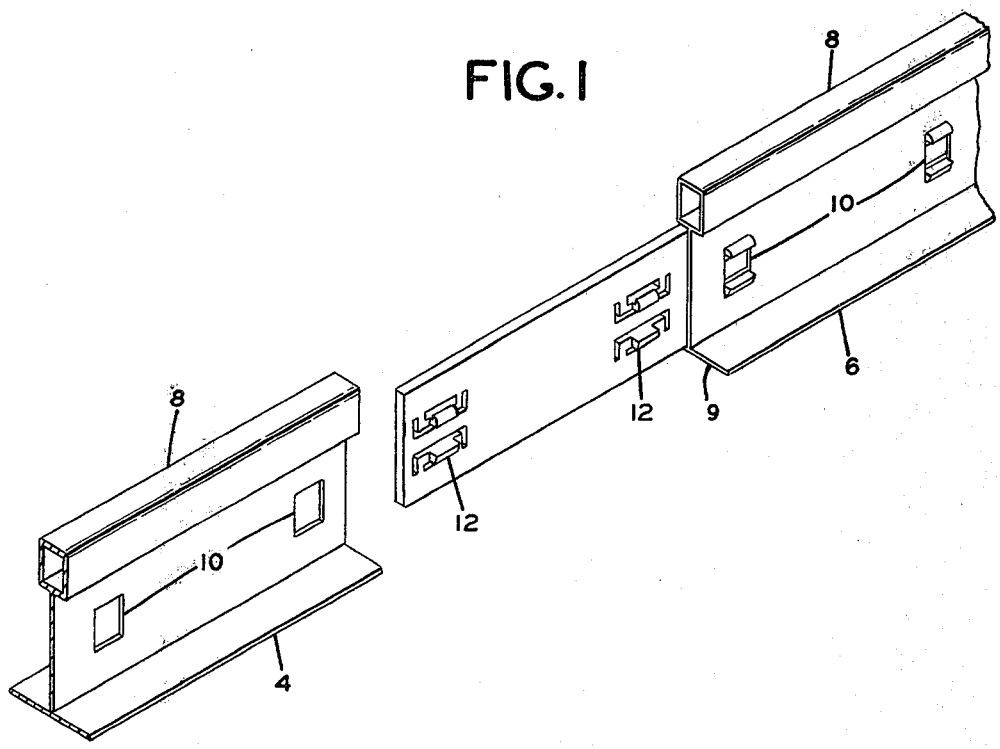
FIG. 1 is a perspective view of the invention herein.

The invention herein is a splicer bar 2 which is used to join together two adjacent runner members 4 and 6. The runner members are conventional inverted T-shaped runner members which have vertical webs 8 and horizontal flanges 9 extending on either side of the bottom of the vertical webs. In the vertical web 8 of each runner, at the end thereof, there are positioned two apertures 10. The apertures are located approximately ½ inch and 2½ inches back from the end of the runner. The apertures are in alignment and are positioned at approximately the mid-region of the vertical web 8. The splicer bar is approximately 6 inches long and will have four snap fasteners or lugs 12 positioned therein. The lugs will be positioned along the splicer bar 2 in such a manner that the two lugs on the one end of the splicer bar will be able to engage the two apertures in runner 6 and the two lugs on the other end of the splicer bar will be able to engage the two apertures of runner 4 when the two runners are placed with their ends in an abutting engagement. The lugs lock the splicer bar to the vertical web of the two runners and thus prevent them from separating.

Figure 2:
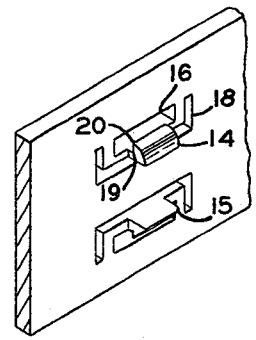
FIG. 2 is an enlargement of a lug structure in the splicer bar of the invention herein.

The lug which engages an aperture is actually composed of two parts and these are shown enlarged in FIG. 2. The lug is composed of projections 14 and 15 which extend out from the planar surface of the splicer bar. The projections have enlarged ends and the enlarged ends are forced past the edge of the aperture and actually engage, to some slight extent, the backside of the aperture to hold the splicer bar in position. An aperture 16 is placed above the projection 14 and a U-shaped aperture 18 is placed below and beside the projection 14 so that there will be some resilience to the mounting of the projection 14. The projection 14 shown in FIG. 2 is the upper projection of the lug arrangement 12. Another projection 15 is positioned below projection 14 and it is faced 180° the opposite direction. Therefore, by each aperture there are two projections forming the lugs 12. The one projection 14 on the upper side of the lug has its enlarged end facing upward and the lower projection 15 has its enlarged end facing downward. At the base 19 of the two projections 14 and 15 forming the lug 12, the distance from the base of one projection to the base of another projection would be equal to approximately the height of the aperture 10. The distance from the top 20 of the enlarged end to the top of the enlarged end of the adjacent projection would be greater than the size of the aperture 10. Consequently, when the two projections 14 and 15 are forced through the aperture, the resilient mounting of the projections will permit the two projections to spring toward each other so that the enlarged ends may pass through the aperture. Then once the enlarged ends are through the aperture, they spring back to their normal position and thereby provide the condition wherein the enlarged ends engage the side of the aperture opposite from that where the splicer bar is positioned so as to hold the splicer bar fixedly in position.

What is claimed is:

1. A joint structure between two runner members wherein the two runner members are inverted T-shaped runner members with a vertical web, each runner member having identical ends wherein two apertures are positioned in each vertical web at the ends of each runner with the apertures spaced a slight distance apart and positioned in alignment along the vertical web, a splicer bar for fastening together the ends of two adjacent runners, said splicer bar having a pair of lugs means on each end of the splicer bar, said pair of lugs means being such that one pair of lugs means engages the two apertures on one end of one runner and the pair of lugs means on the other end of the splicer bar engages the two apertures on the adjacent abutting runner member to fasten together said runner members said lugs being resiliently mounted to snap into and out of engagement with said apertures.

2. The structure of claim 1 wherein the lugs are composed of two oppositely disposed projections, one positioned above the other, said projections being provided with enlarged ends and a resilient mounting means which permits the enlarged ends to be forced into a contracted state and then subsequently an expanded state to retain the spacer bar in position with the two oppositely disposed projections engaging opposite sides of an aperture to fix and retain the spacer bar in engagement with the vertical web of the runner.

3. A splicer bar for use as an engaging means for ceiling runners, said splicer bar being an elongated flat bar structure having two sets of lugs thereon, the lugs being in pairs in each set and being at each end of the splicer bar and projecting from one planar surface thereof, each of said lugs being composed of two projections, one positioned above the other, said projections being provided with enlarged ends and a resilient mounting means which permits the enlarged ends to be forced into a contracted state and then subsequently, an expanded state to retain the splicer bar in position.

* * * * *